United States Patent [19]

Cosgrave et al.

[11] Patent Number: 4,871,053
[45] Date of Patent: Oct. 3, 1989

[54] FRACTURABLE-KEY ACTIVATED CONTROL SYSTEM

[76] Inventors: Dara Cosgrave, 38 Gordon Street, Clontarf, New South Wales 2094; John Roydhouse, 14/10-14 Dural Street, Hornsby, New South Wales 2076, both of Australia

[21] Appl. No.: 94,731

[22] PCT Filed: Nov. 5, 1986

[86] PCT No.: PCT/AU86/00337
§ 371 Date: Aug. 7, 1987
§ 102(e) Date: Aug. 7, 1987

[87] PCT Pub. No.: WO87/02810
PCT Pub. Date: May 7, 1987

[30] Foreign Application Priority Data
Nov. 5, 1985 [AU] Australia ............... PH3261

[51] Int. Cl.$^4$ ............................................... G07F 7/02
[52] U.S. Cl. .................................... 194/208; 194/211
[58] Field of Search ............ 194/205, 208, 209, 214, 194/211, 239

[56] References Cited

U.S. PATENT DOCUMENTS

| | | | |
|---|---|---|---|
| 3,204,741 | 9/1965 | Maxwell et al. | 194/208 |
| 3,249,194 | 5/1966 | Bass | 194/209 |
| 3,338,364 | 8/1967 | Hoffberger, II et al. | 194/209 |
| 3,338,365 | 8/1967 | Hoffberger, II et al. | 194/209 |
| 3,344,897 | 10/1967 | Kliewer | 194/209 |
| 3,432,017 | 3/1969 | Kliewer | 194/209 |
| 3,595,358 | 7/1971 | Chase | 194/208 |
| 3,685,625 | 8/1972 | Loewy | 194/209 |
| 3,944,039 | 3/1976 | Houghtaling | 194/208 |

FOREIGN PATENT DOCUMENTS

| | | | |
|---|---|---|---|
| 2321476 | 11/1974 | Fed. Rep. of Germany | 194/209 |
| 2138193 | 10/1984 | United Kingdom | 194/208 |

Primary Examiner—Joseph J. Rolla
Assistant Examiner—Edward S. Ammeen
Attorney, Agent, or Firm—Ladas & Parry

[57] ABSTRACT

A key activated control unit to be activated by a key having a shank portion and a blade portion, the unit is operated by inserting the key and having the blade portion trigger a switch at a predetermined location. The blade portion is not returnable from that predetermined position, and a key destruction blade is provided to destroy the blade portion once at that predetermined position.

5 Claims, 5 Drawing Sheets

FIG. I

FRACTURABLE-KEY ACTIVATED CONTROL SYSTEM

TECHNICAL FIELD

This invention relates to a fracturable key card or token which operates in a manner similar to a token for the control or activation of a device.

BACKGROUND ART

The field of application of this fracturable key card or token is wide. The types of possible uses include operating coin or token machines such as turnstiles, poker machines, dispensing machines, and pay by time services such as electricity (in particular solar generated). These types of devices which have been operated by the use of coins, tokens, encoded cards or conventional keys usually suffer some disadvantage.

Where the operation is controlled by insertion of a coin or token, and that coin or token is then held within the machine there are problems with the security of the machine and in some cases the cost of collecting the coins and tokens. In machines such as vending machines or pre payment meters which are left in relatively insecure areas they are easily vandalized and the still usable coins or tokens removed. Further, there is significant cost in employing staff to regularly and frequently collect the coins or tokens. Staff employed for this task must be honest as there is the temptation to "pocket" some of the takings especially if the machines are prone to malfunction or the vended product is not well accounted. An especially significant problem with coin operated devices is that the supplier receives in hand the payment a significant period of time after supplying the goods.

Encoded card operated devices can suffer similar disadvantages to the coin or token devices where the encoded card is captured by the device in order to prevent further use. In the cases where the card may be used a multiple number of times it is often difficult to account for how often such device has been used. A further problem with encoded cards is that they are often relatively expensive to produce. A popular form of encoded cards includes a magnetic strip and sophisticated encoding and decoding equipment. The decoding equipment obviously must be present in each machine to be operated by the encoded card, such equipment is very expensive.

Conventional key operated devices have the disadvantage that unlimited use of the key is unavoidable and accounting of the use of the controlled device difficult.

Therefore, it is an object of the present invention to provide a fracturable key which will ameliorate disadvantages of the prior art.

Throughout this specification the term "key" is used in the broad sense and not necessarily limited to conventionally shaped keys.

DISCLOSURE OF INVENTION

There is disclosed herein a key activator control unit, said control unit having a hollow body, an insertion slot in said body and into which a key is inserted to activate said control unit, key destruction means within the body and positioned to engage at least a portion of the key when projecting into said slot, detection means activated by said key to thereby activate said control unit, and wherein said key destruction means deforms or destroys said portion thereby preventing or limiting reuse of the key to again activate said control unit.

The fractured portion may form a mechanical bridge, allowing activation of the device. Further validation is possible by electrical trip or sensors. Such sensors reacting to composition or dimensions of fractured portion. Such detection may provide a signal in response to each fractured portion allowing activation.

Preferably the broken off portion is destroyed within the control unit, though in some applications it may be desirable to collect, within the control unit, such broken off portions to allow for accounting of its use. Where broken off portion is destroyed, usage accounting is achieved by mechanical trip or electronic means.

The broken off portion on its own is insufficient to operate the control unit. Further, a key will be useless on its own, or in combination with a broken off portion.

In some instances it will be preferred that each key includes a number of fracturable portions allowing controlled multiple use thereof.

In a particular preferred embodiment the fracturable key system will be used to control electricity supply on a pay by use basis. In this case single or multiple use keys will be sold at some central location or distributed through existing commercial outlets such as retail shops. When electricity is required one of the keys will be used and the broken off portion activates the control unit. The control unit will then allow the corresponding amount of power or time access to be used before shutting off the supply to the customer. This system replaces coin operated systems which are vulnerable to theft and require frequent collection of coins, it also replaces pay by account systems which have proved to be ineffective in areas such as many Pacific Island communities.

A further use is in the control of access to security buildings. It is often necessary that maintenance personnel must gain access to an area on a one off basis. This type of controlled access is easily provided by this fracturable key system. Such a key can be given to maintenance personnel, for example, without the need to recollect the key or otherwise make sure that non-authorised use does not occur.

An important advantage of the system is the accounting ability. Although the system negates the need for regular collection of coins, tokens or similar valuable items the broken off portions can be stored in the machine and collected on, for example, a six monthly basis or simple trip counter may record usage. It is then easy to account for the use of the particular machine over that six month period.

In a preferred embodiment of the invention the key will be similar in appearance to a conventional key blank with a unique combination of grooves running along the key extension. Proximate the end of the extension is a perforated or otherwise weakened line running across the extension allowing the end to be relatively easily broken off from the remainder of the key. Where the key is to be for multiple use a number of these perforated or weakened lines will occur equally spaced longitudinally along the key extension.

The control unit accepting the key will have a hole for insertion of the key extension and being of a cross-sectional shape closely corresponding to the cross-sectional shape of the key extension. When a key is placed within the hole and fully inserted the fracturable portion will be proximate a breaking means. The breaking means is actuated by turning of the key, and hence the portion of the control unit which includes the hole.

Once they key is turned and the fracturable portion is broken off by the breaking means it will fall through the control unit and pass an optical sensor initiating a control signal to the machine which is being controlled by that control unit. When the fracturable portion has passed the optical or other sensor it continues falling to a large storage bin within the machine. Once the fracturable portion is broken off by the breaking means, it may form a mechanical bridge to allow completion of an operation, such fracturable portion being disfigured in the process.

The body part of a key, once all of the fracturable ends have been used, can form the basis of an incentive system or similar. For example, when 20 such key bodies are collected and returned to the issuing authority a free usable key or other reward can be issued in return.

This invention in its preferred form, has specific importance as a means allowing provision of electricity (solar-diesel-mains generated) in impoverished areas, remote areas, of underdeveloped countries. Allowing pre payment of a day to day or week to week basis requiring no security risks and no collection. It may also serve in the same regions to allow supply or access to any power source or commodity.

BRIEF DESCRIPTION OF DRAWING

A preferred form of the present invention will now be described by way of example with reference to the accompanying drawings, wherein.

MODES FOR CARRYING OUT THE INVENTION

Figure 5:
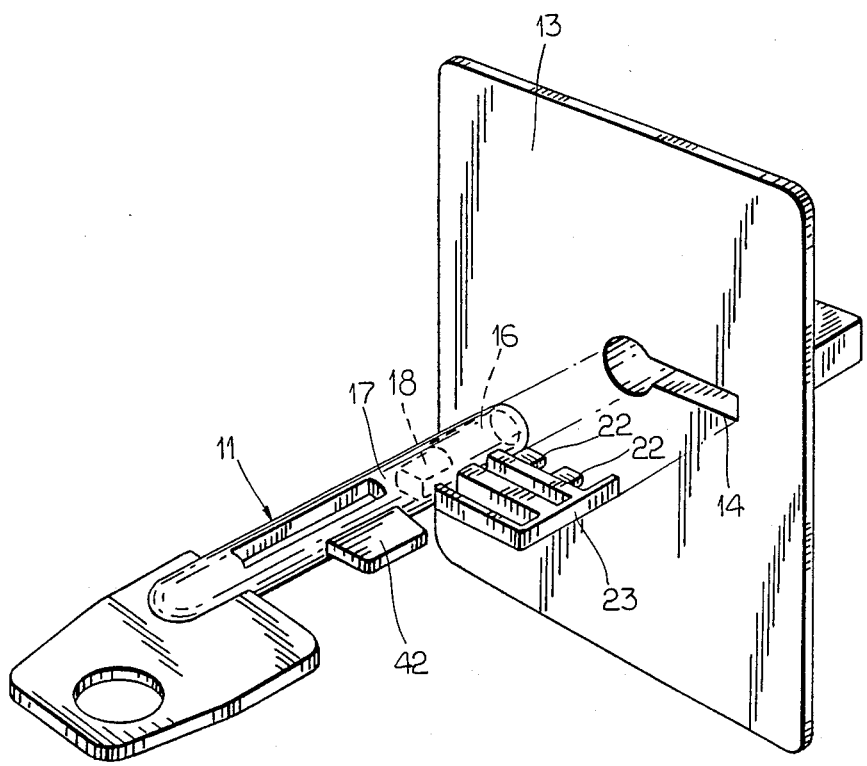
FIG. 5 is a schematic perspective view of a key employed to operate the control unit of FIG. 1.

In the accompanying drawings there is schematically depicted a control unit 10 operated by means of a key 11 (FIG. 5). The control unit 10 consists of a body 12 with a front panel 13 provided with a key insertion slot 14. The slot 14 being shaped to co-operate with the key 11 so that the leading portion of the key 11 may be located within the body 12.

Figure 1:
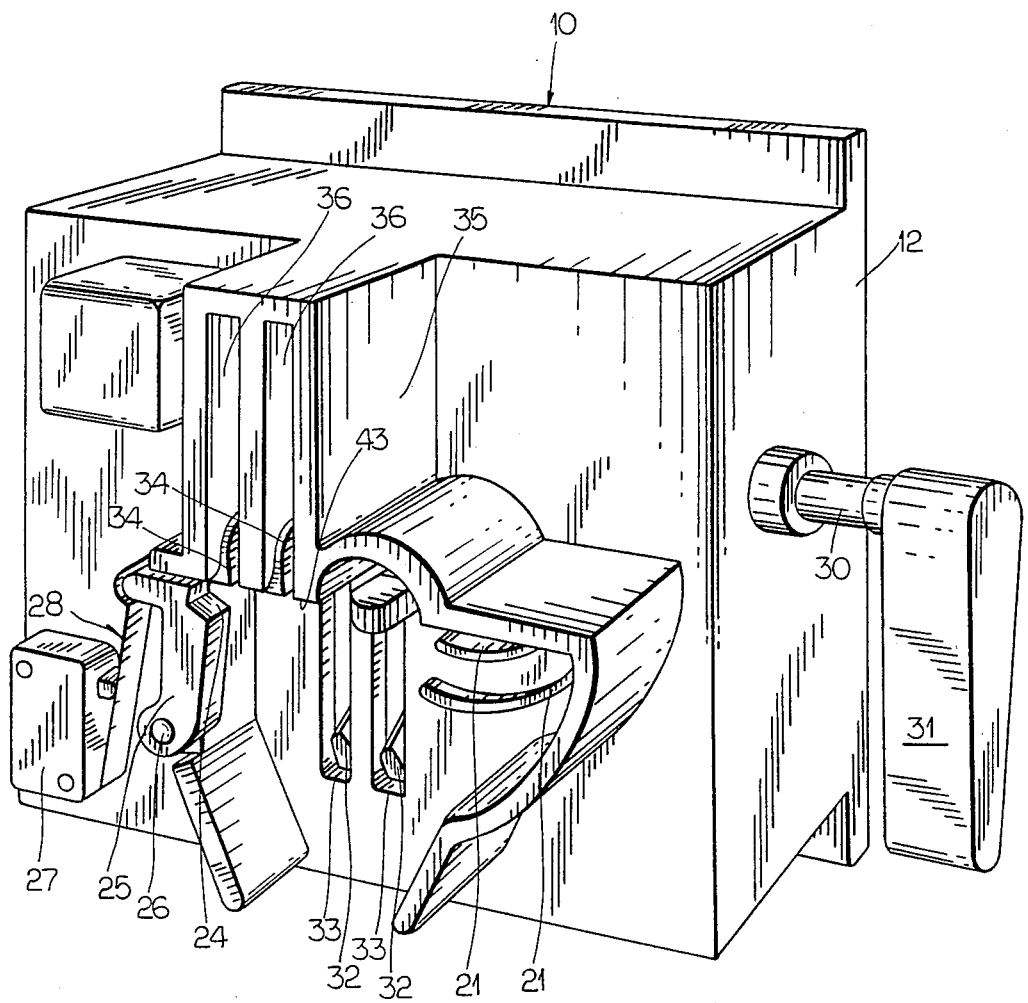
FIG. 1 is a schematic perspective view of a key activated control unit.
Figure 2:
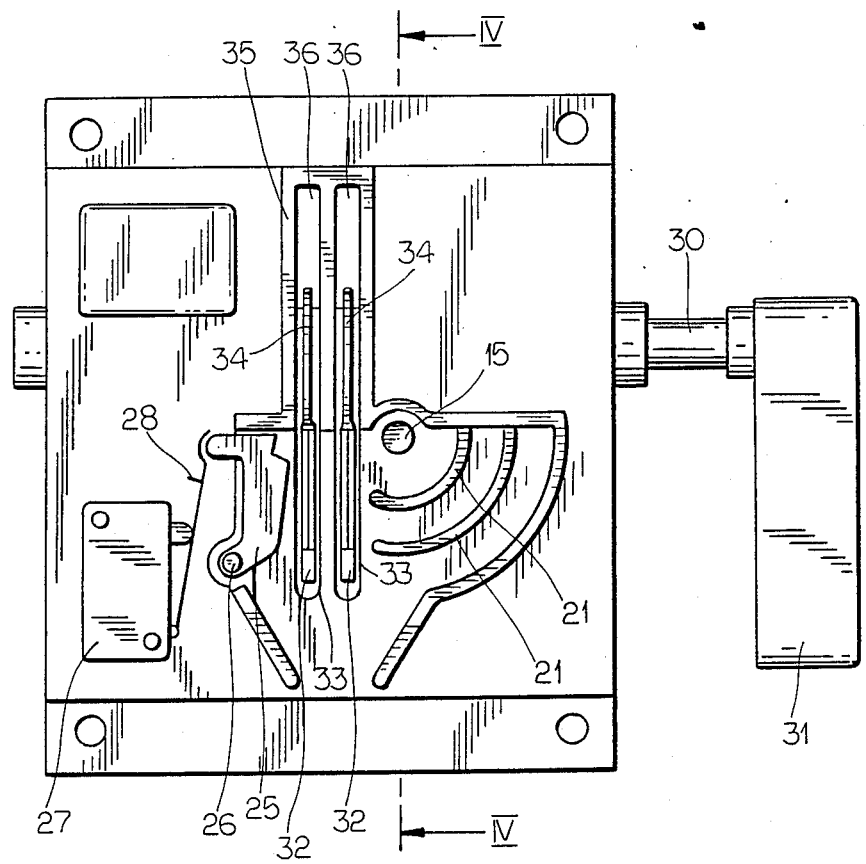
FIG. 2 is a schematic front elevation of the unit of FIG. 1.
Figure 3:
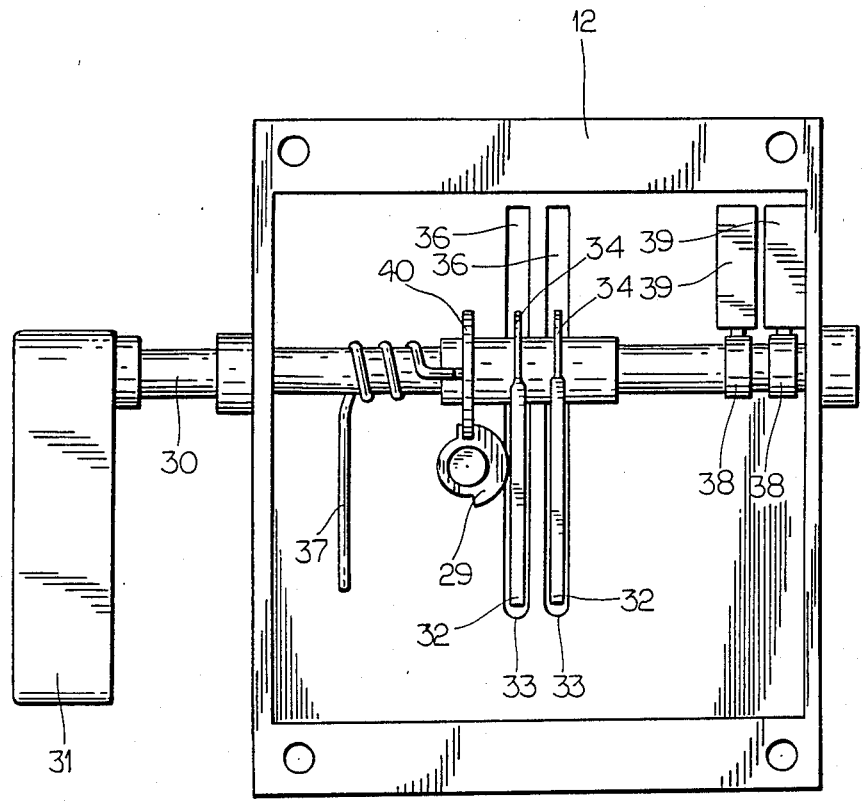
FIG. 3 is a schematic rear elevation of the unit of FIG. 1.
Figure 4:
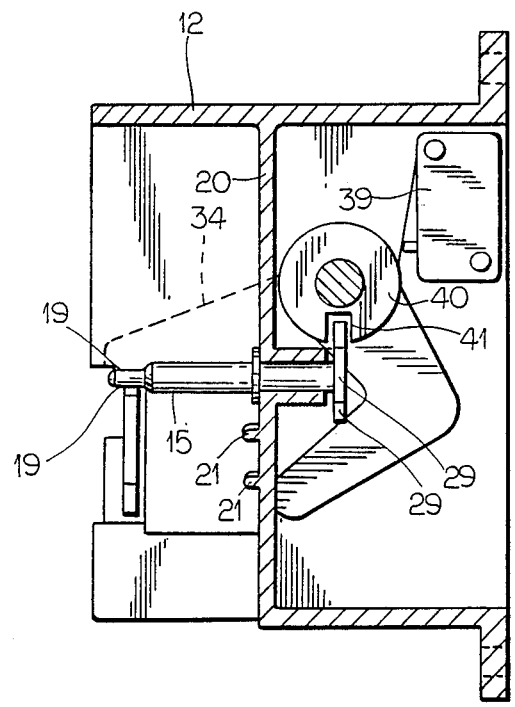
FIG. 4 is a schematic sectioned side elevation of the control unit as depicted in FIG. 2 sectioned along the line AA.

Pivotally mounted within the body 12 is a shaft 15 which is received within the hollow 16 formed in the key shank 17. The hollow 16 terminates at its inner end with flat surfaces 18 which engage key-engaging means in the form of surfaces 19 on the shaft 15, so that upon the key 11 being turned, the shaft 15 turns with it. The body is also provided with an internal wall 20 which has projections 21 which engage grooves 22 of the key 11 to thereby act as a security device in only permitting the use of keys having a particular slot profile. In this particular embodiment, the key is inserted so that the key blade 23 is horizontal. Once inserted the key is rotated anticlockwise until the blade 23 engages an abutment surface in the form of a notch 24 in the pawl 25. The pawl 25 is pivotally mounted on a pin 26 and is angularly deflectable from the position, as shown in FIG. 1, to a position wherein it activates the microswitch 27 via the arm 28. The pawl 25 and miroswitch 27 provide a means of detecting the key. With the blade 23 engaged within the notch 24, the key cannot be rotated in the opposite direction enabling its withdrawal.

The inner end of the shaft 15 is provided with a radially extending flange 29 which extends only partly angularly about the shaft 15.

Also rotatably supported by the body 12 is a shaft 30 provided with a handle 31 to be used by the operator. Fixed to the shaft 30 are blades 32 which are aligned with slots 33 formed in the wall 20. Also projecting from the shaft 30 are further blades 34 which are located in a housing 35 having slots 36 aligned with the slots 33. The blades 32 and 34 are fixed to the shaft 30 so as to rotate therewith. The shaft 30 is engaged by a spring 37 which biases the shaft to the rest position as shown in FIG. 1. If so desired one end of the shaft 30 can be provided with cams 38 which activate counters 39. Also mounted on the shaft 30 is a radially extending flange 40 which has a slot 41 positioned so that the flange 39 may pass angularly therethrough.

The blades 32 and flange 40 provide key blade engaging members, which are selectively engaged by a movable stop provided by the shaft 15 and flange 29, as best described above.

In operation of the above described control unit 10, the key 11 is inserted and rotated until the blade 23 is engaged in the notch 24. Accordingly the switch 27 is then activated. At this time, the flange 29 has also been rotated so as to free the flange 40. Thereafter the operator can rotate the shaft 30 by means of the handle 31 so that the blades 32 are moved to engage the blade 23. Sufficient force is then applied to the handle 31 to destroy the blade 23 thereby rendering the key unusable and allowing withdrawal of the remainder of the key. The blades 32 are moved angularly until they engage within the slots 36 to ensure destruction of the blade 23. The handle 31 is then rotated in the opposite direction and the blades 32 remove any remaining blade portions located within the slots 36. The remainder of the key may then be removed.

The switch 27 can then be connected to a timing mechanism or other device to be controlled by the unit 10.

The key 11 is also provided with a flange 42 which abuts the underside surfaces 43 of the housing 35 to prevent twisting of the key when the blade 23 is being destroyed.

It should be appreciated that the above described embodiment is merely one control unit which is activated by a key and destroys part of the key to limit or to prevent further use of the key. As a further alternative, the control unit 10 could be provided with an angled slot which engages a generally planar key, so that the end portion of the key is deformed and broken. The key could have transversely extending weakened portions to aid in fracturing the end portion of the key.

We claim:

1. A key activated control unit to be activated by a key having a shank portion and a blade portion, said unit comprising:

a hollow body;

a key insertion slot formed in a side surface of said body for insertion of said key to locate said blade portion within said body, said slot being shaped to locate said blade portion at a predetermined position within said body;

key detection means at a further position angularly spaced from said predetermined position relative to a longitudinal axis of said shank portion, and positioned radially relative to said slot for engaging said blade portion upon rotation thereof about said axis of said shank portion from said predetermined position to said further position, and responsive to engagement by said blade portion for detecting that said key has been inserted; and key destruction means engaging said blade portion at said further position for deforming the blade portion thus limiting further use of the key, said destruction means including an abutment surface preventing movement of the blade portion back to said predetermined position without deformation of the blade portion.

2. The key activated control unit of claim 1, wherein said key destruction means includes a pivotally mounted pawl angularly movable from a position extending into the path of travel of the blade portion between the predetermined and further positions, and angularly deflectable to a position permitting movement of the blade portion to pass thereby, said pawl including said abutment surface which projects into the path of travel of the blade portion thereby preventing movement of the blade portion from said further position back to said predetermined position.

3. The key activated control unit of claim 2, wherein said key destruction means includes a blade engaging member movable along a predetermined path passing through said predetermined position so as to deform the blade portion when located thereat.

4. The key activated control unit of claim 3, further including operator manipulable means connected to said engaging member so that an operator of the unit can cause movement thereof, a movable stop means selectively engagable with said engaging member to prevent movement thereof to deform said blade portion, said stop means including a key engaging portion which is moved by said key to release said engaging member for movement.

5. The key activated control unit of claim 4, wherein said engaging member is pivotally mounted so as to rotate about an axis transverse of the rotational axis of said key, and said stop means is pivotable about an axis coterminus with the longitudinal axis of the blade portion of the key.

* * * * *